May 19, 1964 R. J. COHEN 3,133,446
LIGHT WEIGHT, PRECISION LINEAR ACCELEROMETER
Filed April 17, 1961 5 Sheets-Sheet 1

ROBERT J. COHEN
INVENTOR.

BY
ATTORNEYS

May 19, 1964   R. J. COHEN   3,133,446
LIGHT WEIGHT, PRECISION LINEAR ACCELEROMETER
Filed April 17, 1961   5 Sheets-Sheet 3

ROBERT J. COHEN
INVENTOR.

BY
ATTORNEYS

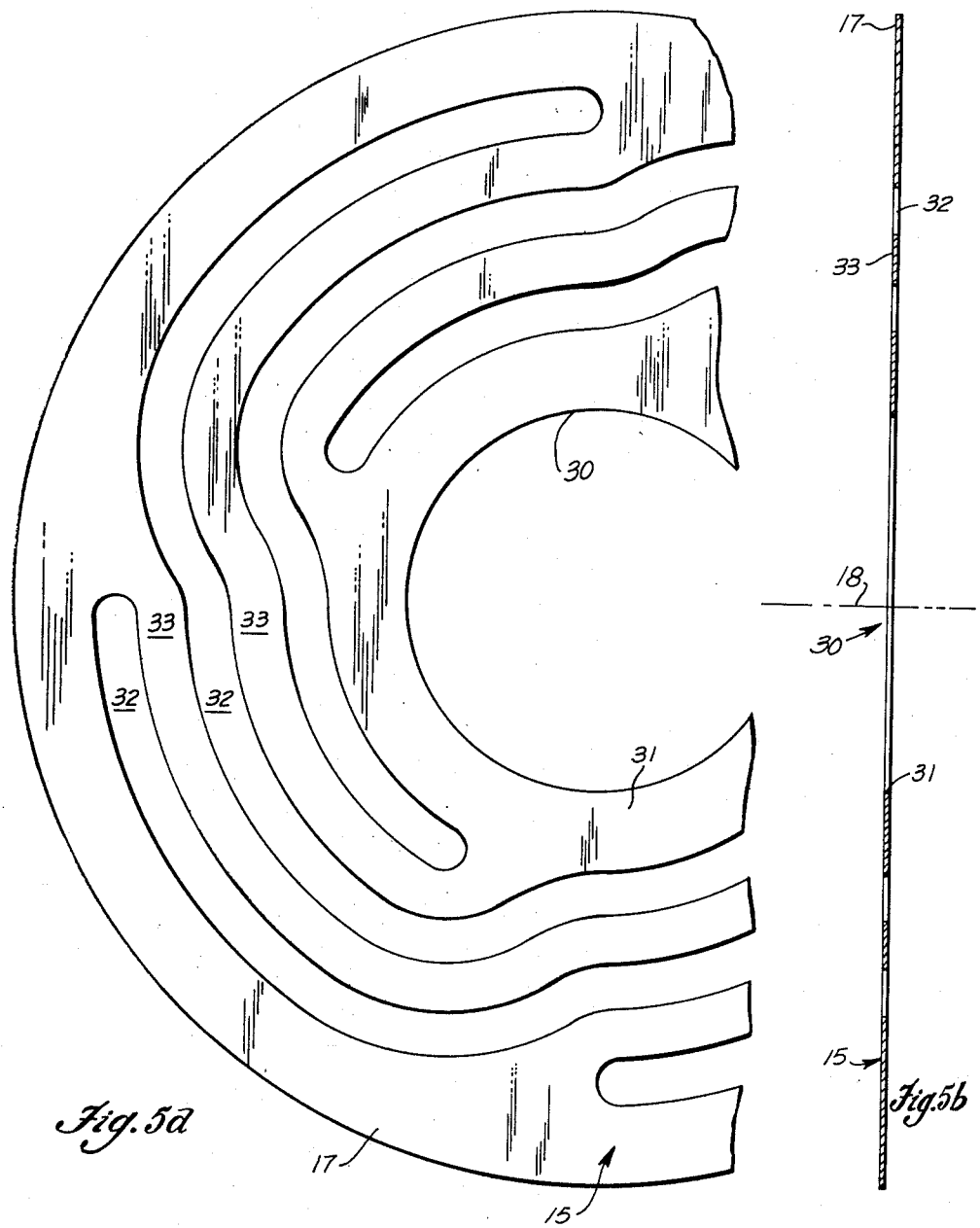

May 19, 1964   R. J. COHEN   3,133,446
LIGHT WEIGHT, PRECISION LINEAR ACCELEROMETER
Filed April 17, 1961   5 Sheets-Sheet 5
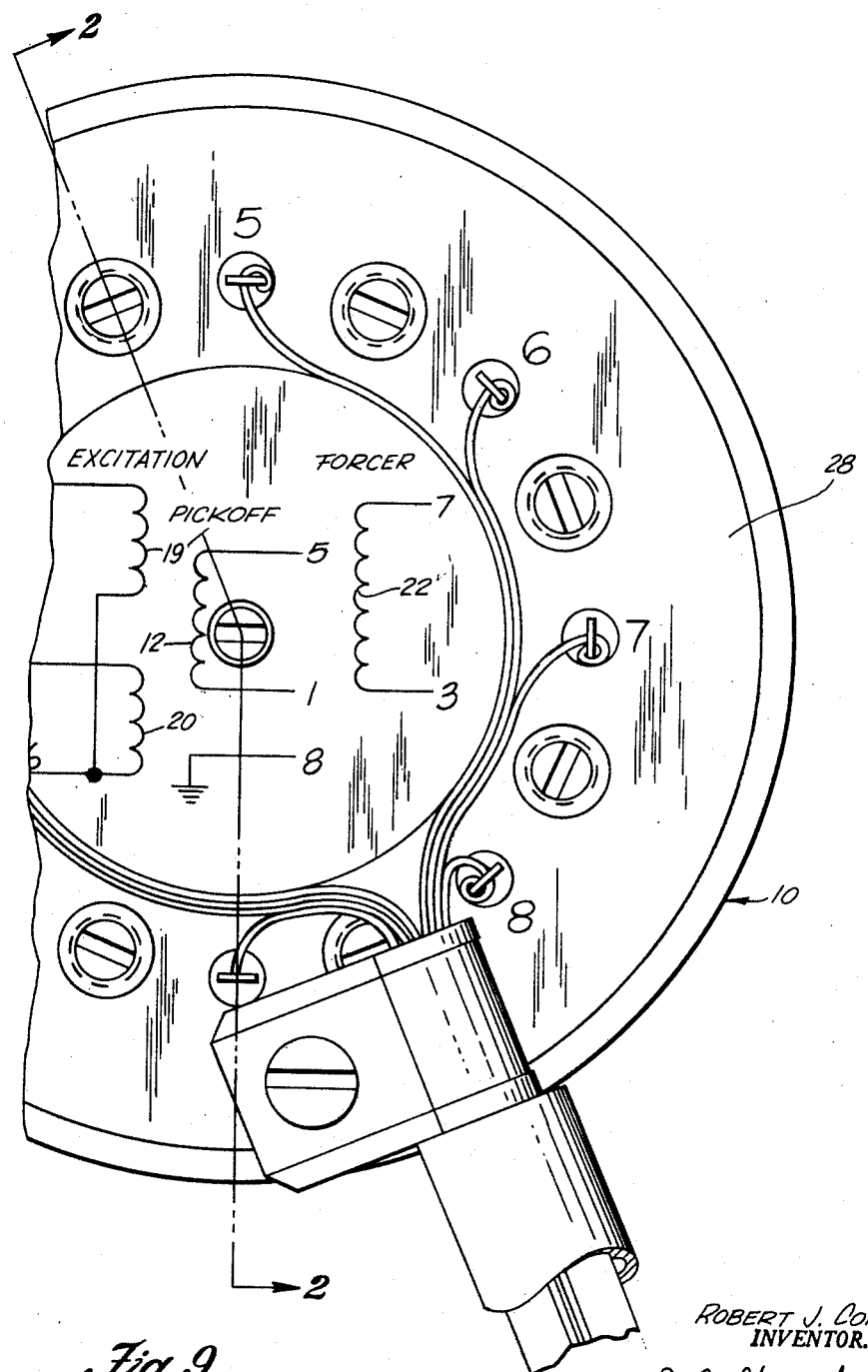
Fig. 9
ROBERT J. COHEN
INVENTOR.
ATTORNEYS United States Patent Office 3,133,446
Patented May 19, 1964

3,133,446
LIGHT WEIGHT, PRECISION LINEAR
ACCELEROMETER
Robert J. Cohen, Wyckoff, N.J., assignor to General
Precision Inc., Little Falls, N.J., a corporation of
Delaware
Filed Apr. 17, 1961, Ser. No. 103,549
8 Claims. (Cl. 73—517)

This invention relates to improvements in linear accelerometers having a displaceable inertia mass and more particularly to precision accelerometers of small size and light weight for use in aircraft, missiles, and the like.

This invention is particularly concerned with providing a high-performance acceleration detecting instrument of small size and light weight, yet possessing improved sensitivity and accuracy.

It is accordingly an object of the invention to provide a compact and light weight accelerometer having an improved spring suspension system for the inertia mass.

A further object is to provide such accelerometer having an improved displacement transducer and torque restoring means.

Still another object of the invention is to provide such an accelerometer wherein all of the functioning parts are concentrically mounted to reduce the size and weight of the accelerometer while providing improved rigidity and without sacrificing the sensitivity and accuracy thereof.

Other objects and many additional advantages will be more readily understood by those skilled in the art after a detailed consideration of the following specification taken with the accompanying drawings wherein:

FIGURES 5a and 5b are an enlarged plan, section and a cross-sectional view, respectively, of the preferred disk spring construction;

FIGURE 9 is a plan view showing the rear face and terminal electrical connections to the accelerometer.

Figure 1:
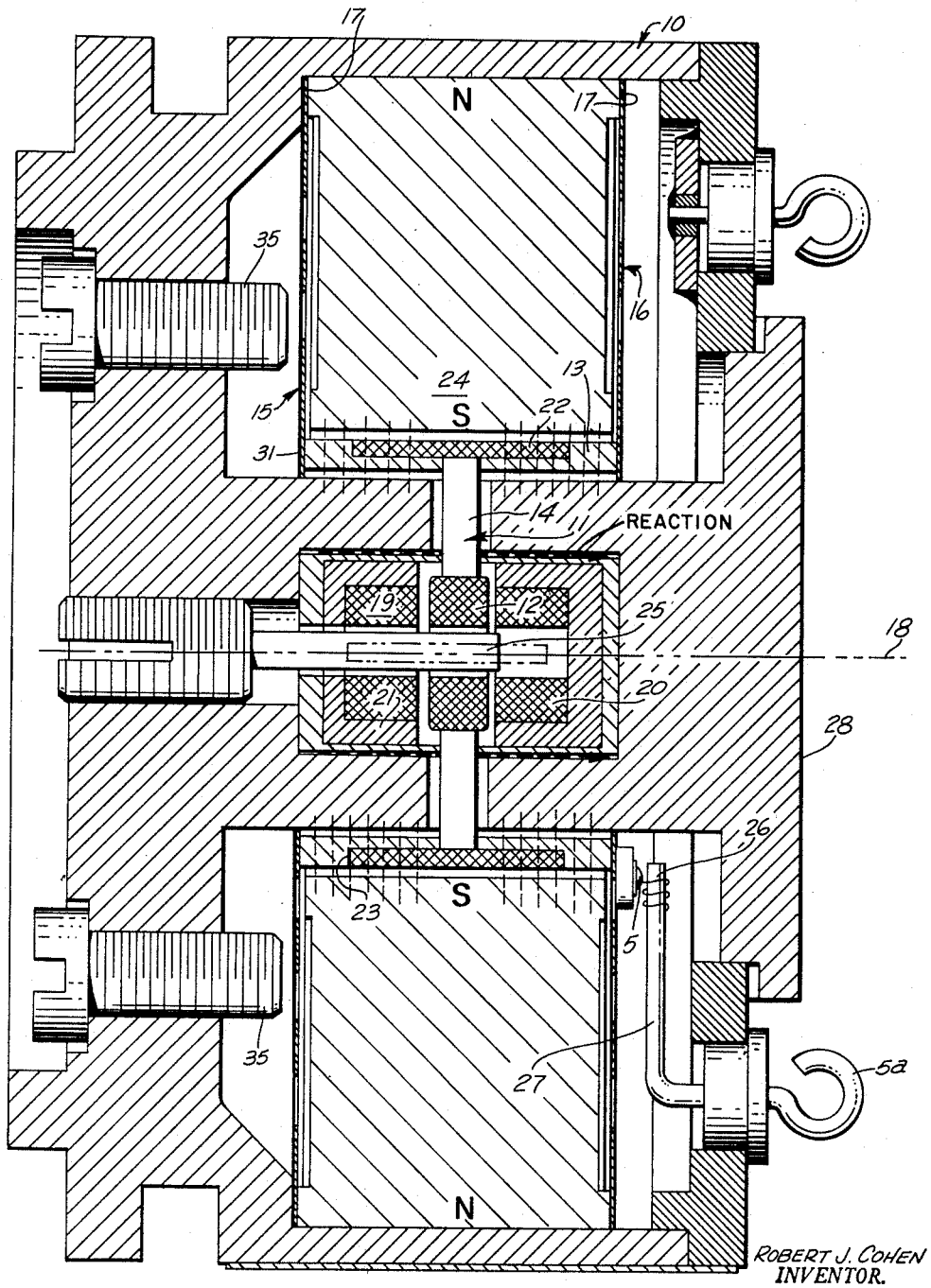
FIGURE 1 is a cross-sectional view illustrating one preferred embodiment of the invention.

Referring now to the drawings, there is shown in FIGURE 1, the overall accelerometer construction, including a cylindrical outer housing 10, and a generally cylindrical longitudinally movable proof mass 11 supported within the housing for displacement along one central sensitive axis 18 thereof. For measuring the displacement of the proof mass 11, there is provided a magnetic transducer means including a longitudinally movable coil 12 and a pair of fixed stator coils 19 and 20; located on opposite sides of the movable coil, and for restoring the proof mass 11 to its central or neutral position there is provided an electromagnetic force restoring means including a tubular movable force coil 22 for interaction with the magnetic flux of a permanent magnet member 24, which surrounds the force coil 22.

Figure 5:
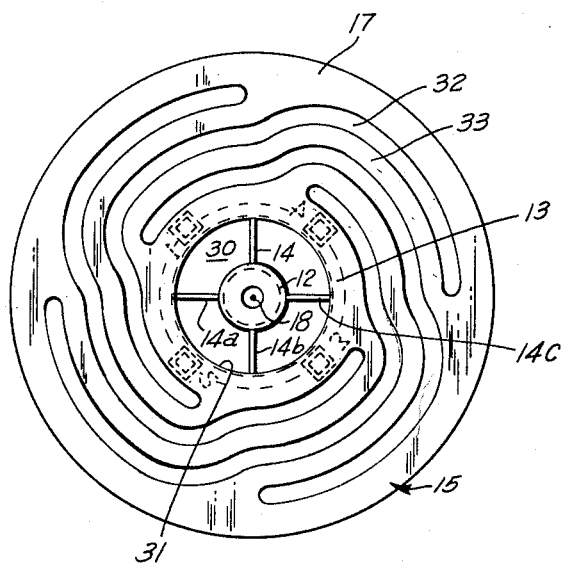
FIGURE 5 is a plan view illustrating a preferred disk spring construction.
Figure 3:
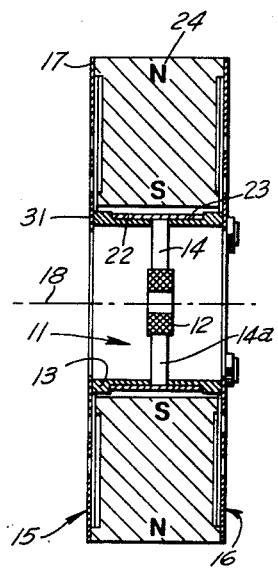
FIGURE 3 is a partial sectional view illustrating details of the proof mass and force restoring means of FIGURE 1.

Considering this preferred construction in greater detail, the outer housing 10 is in the form of a thin cylindrical container having a diameter much greater than its thickness or depth. Within this hollow housing 10, the displaceable inertia proof mass 11 is in the form of an annular wheel, having an inner hub part 12 in the form of a coil, which is concentrically supported within an outer annular frame part 13 by means of a series of radial spokes 14, 14a, 14b, 14c, as best shown in FIGURE 5. This annular proof mass 11 is sandwiched between a pair of flat disc springs which are known as geophysical springs 15 and 16, as shown in FIGURES 3 and 5, which are fastened within the housing 10 only at their outer peripheral region 17, whereby the flat disc springs 15 and 16 may be flexed in unison along the sensitive axis 18, thereby enabling reciprocal displacement of the proof mass 11 along this sensitive axis in response to acceleration forces.

The central hub part 12 of the proof mass 11 is comprised of an annularly wound coil serving as the movable coil of the displacement transducer, and this coil 12 is disposed to lie between a pair of spaced annular stator coils 19 and 20 that are immovably supported within a magnetic shielding container 21 (FIG. 6), which container is fixed in position within the outer housing 10. The movable coil 12 together with the pair of stator coils 19 and 20 are disposed coaxially along the sensitive axis 18 of the accelerometer and, therefore, displacement of the proof mass 11 differentially varies the air gap spacing between the movable coil 12 and the fixed coils 19 and 20 to differentially vary the inductive relationship of this movable coil to the stator coils.

As thus far described, therefore, there is provided a cylindrically shaped accelerometer device having a wheel shaped longitudinally movable proof mass 11 centrally supported therein by means of a pair of flat geophysical springs 15 and 16, that sandwich the proof mass between the geophysical springs and permit its displacement along only one sensitive axis 18. The hub portion 12 of the proof mass 11 serves as a longitudinally movable coil of a displacement transducer or pickoff.

Figure 4:
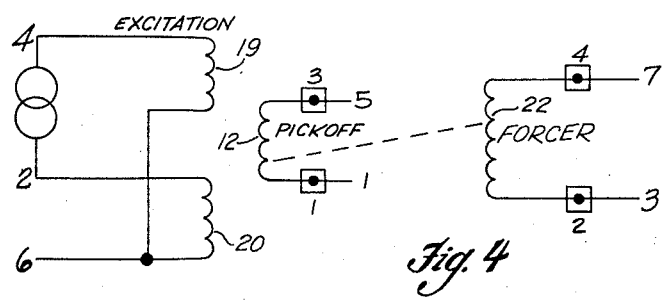
FIGURE 4 is an electrical schematic illustration of the displacement transducer and force coil employed in the accelerometer.

In operation, the outer or stator coils 19 and 20 of the pickoff or transducer are adapted to be reversedly energized, as shown in FIGURE 4, whereby displacement of the proof mass 11 and longitudinally movable coil 12 toward one or the other of these stator coils 19 and 20 induces a voltage in the movable coil 12 of opposite polarity and at an amplitude that is proportional to the extent of the displacement of the proof mass along sensitive axis 18. The displacement of the proof mass 11 along this sensitive axis 18 is proportionally resisted by the flat geophysical springs 15 and 16, whereby the ultimate displacement of the proof mass 11 against the restoring force of the flat geophysical springs is proportional to the acceleration force being exerted on the proof mass 11. This longitudinal displacement is, in turn, measured by the transducer or pickoff coils to produce an output voltage from the transducer movable coil 12 whose polarity indicates the direction of displacement or acceleration along sensitive axis 18 and whose amplitude is proportional to the amplitude of the acceleration force.

In precision accelerometers, it is desired to limit the excursions of the proof mass 11 in response to acceleration, to a very small displacement and to provide a restoring force in feedback relation to rapidly return and maintain the proof mass 11 in its neutral position after each excursion or displacement thereof. To provide this force restoring means without unduly increasing the size and weight of the accelerometer, the force coil 22 is circumferentially wound within a suitable groove 23 formed in the outer wheel part 13 of the mass 11 and is, therefore, coaxial about the sensitive axis 18 of the proof mass 11 to produce a magnetic flux along this axis.

As best shown in FIGURE 3, the complete proof mass member 11, including the force coil 22 is located within the central opening of an annularly shaped permanent magnet 24. The circumferential outer and inner surfaces of the permanent magnet 24 are magnetized as opposite poles of the magnet as shown in FIGURE 1, thereby to produce magnetic flux that travels radially through the central opening of the magnet or in plane substantially perpendicular to the sensitive axis 18 in the manner shown by the magnetic lines of force between the central portion of the permanent magnet and the hubs of the return path fitted to the central opening through the return path, as shown in FIGURE 1. Since the force coil 22 is also wound about sensitive axis 18 as its center, the flux being produced by this force coil 22 is directed along sensitive axis 18 in a direction perpendicular to that of the permanent magnet 24. The outer housing 10, shown in FIGURE 1, which serves as a return path for the permanent magnet 24, is made of stainless steel, or electrical ingot iron, or magnetic iron such as Armco ingot iron. The rear face 28, of the outer housing, which is located adjacent the open (right-hand) face of the housing, also serves as a return path for the permanent magnet, and is therefore made of essentially the same material as the outer housing. The annular plate, which supports the rear face of the outer housing, also functions as part of the return path of the permanent magnet, as indicated in FIGURE 1. Consequently, by reversedly energizing the force coil 22, a resultant force is produced by the reaction of the flux of the permanent magnet and the flux of the force coil, to produce a force or motor action on the proof mass 11 and reciprocally displace the proof mass 11 along sensitive axis 18 in opposition to the acceleration force. The magnetic lines of force of the outer circumference of the permanent magnet are designed as "N" in FIGURE 1. Similarly the magnetic lines of force in the portion of the permanent magnet surrounding the central opening therethrough is oppositely magnetized and designed "S" in FIGURE 1. The magnetic lines of force passing from the central portion of the permanent magnet to the inner hub section of the outer housing, and the mating inner hub section of the rear face of the outer housing follow the path of the dot-dash lines shown in FIGURE 1, along planes perpendicular to the sensitive axis 18. The reaction force between the magnetic lines of force of the inner portion of the permanent magnet, and the flux produced by the force coil generate a reaction force which is indicated by the lines shown in FIGURE 1, which are substantially parallel to the sensitive axis 18.

Figure 7:
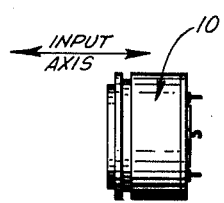
FIGURES 7 and 8 are side elevational views of outer accelerometer housings and comparatively illustrating the reduction in size that may be obtained by employing the present invention.
Figure 8:
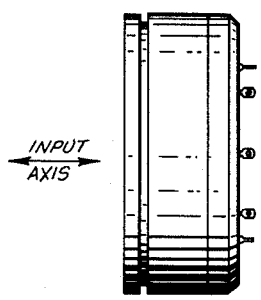

It is to be particularly noted that the annular construction of the parts and their coaxial assembly within the accelerometer housing as described, provides an extremely compact arrangement of the functioning elements, since the proof mass, displacement transducer, and force coil are all located within the central provided in the annularly shaped permanent magnet 24. Additionally, the geophysical springs 15 and 16 are made thin and flat, and the movable proof mass element 11 can be made quite small as may be the annular pickoff coil and the stator coils 12, 19 and 20. For this reason, the width or thickness of the accelerometer can be reduced considerably over that of known accelerometer constructions and the diameter of the accelerometer may likewise be reduced in size. The considerable reduction in size that may be obtained by means of the present construction is best illustrated by the two housings shown in FIGURES 7 and 8, where FIGURE 7 illustrates proportionally an accelerometer constructed according to the present invention, whereas FIGURE 8 represents a prior accelerometer construction, having generally the same sensitivity and accuracy as that of FIGURE 7.

Figure 6:
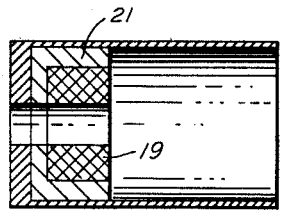
FIGURE 6 is a sectional view illustrating details of the transducer stator winding and its supporting and shielding structure.

It is to be additionally noted that the concentric arrangement of the force coil 22 and the permanent magnet 24, together with the pickoff or transducer coil and the stator coils 12, 19 and 20, decreases the possibility of magnetic flux from the force producing means undesirably interacting with the flux in the displacement transducer coils. To prevent any such undesirable interaction of the flux paths, the stator pickoff coils 19 and 20 are enclosed within an inner housing part 21 of magnetically susceptible material, as best shown in FIGURE 6. This magnetic enclosure effectively isolates the flux from the force restoring means from interfering with the flux in the region on the pickoff transducer. The movable pickoff coil 12 and stator coils 19 and 20 are also inductively coupled together by means of an adjustable rod 25, or the like, which is disposed along sensitive axis 18 and passes through the central openings of these coils to serve as a transformer core between the coils to improve the coupling therebetween.

As best shown in FIGURE 4, the electrical connections to the accelerometer are relatively few in number, totaling only seven, and are easily made to similarly numbered terminals circularly spaced from one another in a pattern on the rear face 28 of the accelerometer housing 10, as best shown in FIGURE 9. As shown in FIGURE 4, only terminals 1, 5, 3, and 7 are movable within the housing, being connected respectively to the movable pickoff coil 12 and movable force coil 22; and the remainder of these terminals are affixed within the housing to the stator coils 19 and 20. Referring to FIGURE 1, the movable terminals, such as terminal 5, as shown, are connected by means of a flexible lead 26 to the terminal post connection 5a on the rear wall of the housing 10 adjacent the rear face 28 of the housing cap and consequently, permit the relative movement between the inner terminal 5 on the inside of the housing and the fixed outer terminal 5a on the rear surface of the housing.

As best shown in FIGURES 5, 5a and 5b, the flat geophysical springs 15 and 16 are preferably formed as annularly shaped thin discs made of suitable spring metal, such as beryllium copper alloy, or the like. The outer peripheral edges of the spring discs are suitably fastened within the housing at 17 and the central openings 30 thereof are aligned along sensitive axis 18 to expose the pickoff coil 19 and to accommodate the pickoff stator coil assembly, shown in FIGURE 6. The outer ring portion 13 of the proof mass 11 is fastened on opposite sides thereof near the inner circular edges 31 of the geophysical springs 15 and 16, whereby the geophysical disc springs 15 and 16 sandwich the proof mass 11 and jointly restrain its displacement along sensitive axis 18 in the manner described.

To provide the desired flexibility of geophysical springs 15 and 16 along sensitive axis 18, yet prevent displacement of the proof mass 11 about any other axis, the geophysical disc springs 15 and 16 are each preferably formed with a series of unconnected and overlapping arcuate cutouts 32, which cutouts provide a series of generally circumferentially arranged spring arms 33. The outer ends of each of these spring arms 33 are integral with the outer edge portion 17 of the geophysical disc springs, which edge portion is fastened to the housing 10 as mentioned above. The inner ends of these spring arms 33 are integral with the inner edge portion of the geophysical disc springs at 31, which inner edge portion is connected to the outer ring portion 13 of the proof mass 11.

Thus, the proof mass 11 is effectively spring supported on both sides thereof by a series of flat arcuately directed spring arms 33 which permit spring restrained displacement of the proof mass along sensitive axis 18 but prevent displacement of the proof mass along any other axis.

To prevent excessive vibration or other spurious forces from displacing the proof mass 11 beyond the elastic limit of the spring arms 33, the housing is provided with adjustable stop members 35 in the form of threaded studs, that project inwardly toward the geophysical disc spring 15 at the left-hand side thereof, as shown in FIGURE 1. These stop members 35 are threadably supported in the wall of housing 10, as shown, for variable adjustment toward and away from the geophysical disk spring 15.

Figure 2:
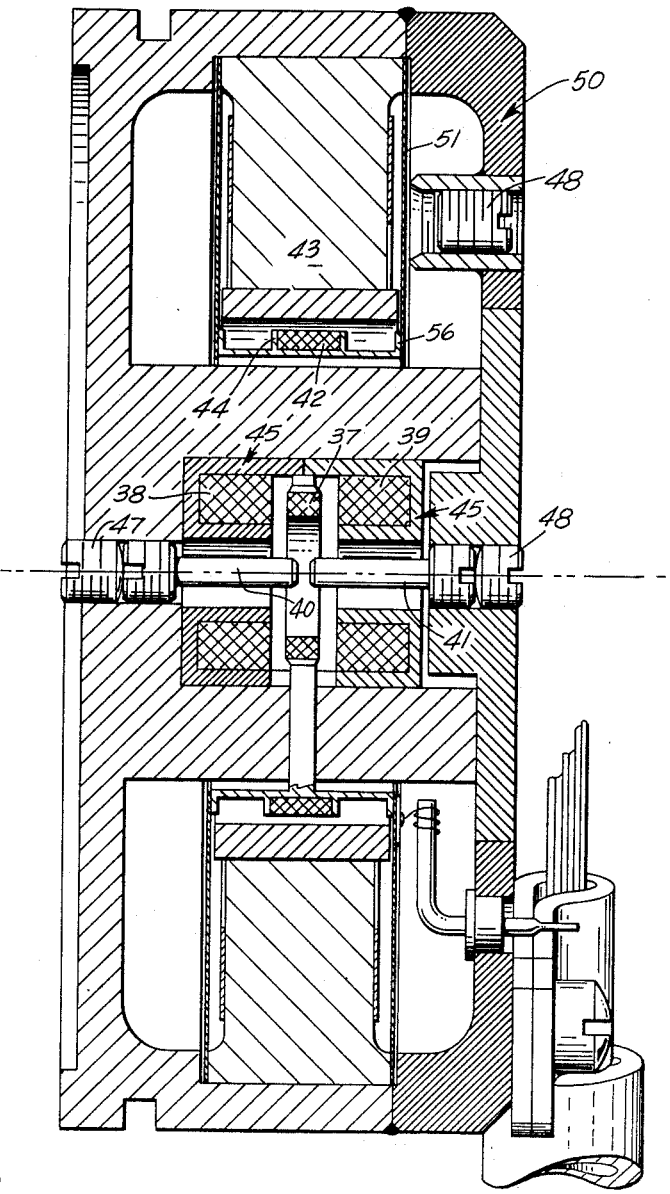
FIGURE 2 is a cross-sectional view illustrating a second embodiment of the invention.

FIGURE 2 illustrates an alternative accelerometer construction that is generally similar to the embodiment of FIGURE 1 but is provided with certain modifications. As shown, the proof mass construction is generally similar to that of FIGURE 1 and comprises a movable pickoff coil 37 positioned at the hub thereof and a coaxially arranged outer movable force coil 42 supported on the outer ring part 56. The construction of this outer ring part 56 is somewhat different from that of part 13 in FIGURE 1, being formed as a flat band having upstanding annular side walls such as 44 for supporting the force coil 42.

A cylindrical ring-type permanent magnet 43, similar to that shown in FIGURE 1, is fitted to the interior of the housing.

The force coil 42 is fitted to the central opening through the permanent magnet 43. The operation of the permanent magnet 43, and its function relative to the force coil 42 is substantially the same as that shown in FIGURE 1, and hereinbefore described.

The construction of the stator pickoff coils 38 and 39 and the magnetic shielding and housing assembly 45 is also generally the same as that of FIGURE 1, but for improving the coupling of the stator coils 38 and 39 to the rotor coil 37 there is provided a pair of adjustable headed rods 40 and 41, as shown, the heads of which may be threadably supported within the accelerometer housing for adjustment along sensitive axis 18 toward or away from each other. This arrangement permits a more symmetrical transformer coupling of the stator coils with the movable pickoff coil 37.

Each of the adjustable headed rods 40 and 41 are also provided with a lock screw, such as 47 and 48, as shown, for the purpose of preventing unauthorized axial adjustment of the adjustable rods 40 and 41 once they have been precisely aligned and the transducer has been balanced.

The stop means 52 for limiting the displacement of the proof mass is also changed as shown, to provide limit stops at the right-hand geophysical disk spring 51 rather than of the left-hand disc spring as in FIGURE 1.

The stop means in the form of a headless screw 48, is inserted in the outer wall of a cover 50, which is fixedly attached to the open end of the housing.

As is believed evident to those skilled in the art, many other changes and variations may be made in the preferred accelerometer construction without departing from the spirit and scope of the invention. Consequently, this invention is to be considered as being limited only by the following claims appended thereto.

What is claimed is:

1. A linear accelerometer comprised of annularly shaped functioning parts that are coaxially assembled comprising: a cylindrically shaped hollow housing, an annular permanent magnet within the housing, the permanent magnet being so magnetized that the magnetic lines of force through the interior of said magnet are located in planes substantially perpendicular to the longitudinal axis of the permanent magnet, an annular proof mass structure concentric within the central opening of the annular permanent magnet, said proof mass being flexibly supported for displacement only along the concentric axis, said proof mass supporting an annular force winding concentric with said concentric axis for interaction with said permanent magnet, and supporting an annular displacement transducer coil concentric with said force winding and disposed inside thereof, a pair of annular stator pickoff coils spaced on opposite sides of said annular displacement transducer coil and affixed within said housing, said stator pickoff coils being coaxial with said annular displacement transducer coil, and magnetic shielding means for preventing flux interaction between the torque coils and the permanent magnet and the annular displacement transducer coil and fixed pickoff coils, said flexible supporting means for said proof mass including a pair of annular flat springs sandwiching said proof mass and being supported by said hollow housing at the peripheral edges of the flat springs, a transformer core mounted within the annular displacement pickoff coil and the annular stator pickoff coils, coaxially therewith, and means longitudinally adjustably supporting said transformer core, said transformer core being operative to improve the electrical coupling between the annular displacement pickoff coil, and the stator pickoff coils.

2. In the accelerometer of claim 1, each of said annular flat springs being formed with a series of unconnected arcuate cutout regions therein, thereby to provide a plurality of generally radially directed arcuate spring arms annularly connected together at the ends thereof, whereby the annular flat spring may be flexed along only its central transverse axis and prevents displacement about any other axis thereof.

3. A linear accelerometer comprising a cylindrically shaped hollow housing, an annularly shaped permanent magnet mounted within the hollow housing, the permanent magnet being so magnetized that the magnetic lines of force through the interior of said permanent magnet are located in planes substantially perpendicular to the longitudinal axis of the permanent magnet, an inertia proof mass member disposed within the central opening of the permanent magnet and being flexibly supported for displacement only along an axis concentric with the permanent magnet, said proof mass having a force winding thereon disposed to produce magnetic flux in a direction along said concentric axis, a movable annular pickoff coil supported by said proof mass concentrically along said concentric axis, a pair of fixed stator windings fixedly supported along said concentric axis and spaced on opposite sides of said annular pickoff coil, and a shielding of magnetically susceptible material substantially completely enclosing said fixed stator windings to isolate said stator windings from said permanent magnet and force coil, said flexible supporting means for said proof mass comprising a pair of annular disc springs disposed on opposite sides of said annular permanent magnet and sandwiching said proof mass member therebetween, said annular disc springs being fixedly supported near the outer peripheral edges thereof, thereby to enable flexure of said annular disc springs in unison along said concentric axis, a transformer core fitted to the interior of the movable pickoff coil and the stator coils, coaxially therewith, said transformer core including a pair of longitudinally adjustably supported headed rods, threadably supported by the outer housing, said transformer core being operative to improve the electrical coupling between the movable annular pickoff coil, and the fixed stator coils.

4. In the accelerometer of claim 3, each of said annular disc springs being formed with a series of unconnected arcuate cutout regions therein, providing a plurality of generally radially directed arcuate spring arms interconnected with said proof mass.

5. A miniature linear accelerometer comprised of a cylindrically shaped hollow housing, a small annularly shaped permanent magnet supported within said hollow housing, the permanent magnet being so magnetized that the magnetic lines of force through the interior of said permanent magnet are located in planes substantially perpendicular to the longitudinal axis of the permanent magnet, a generally wheel shaped proof mass element concentric with the permanent magnet and disposed within the central opening of the annular permanent magnet, along a sensitive axis, said proof mass being flexibly supported for displacement along the sensitive axis, said proof mass element having an inner hub part and an outer cylindrically shaped part, with the outer cylindrically shaped part being closely spaced concentrically from the inner transverse wall of the permanent magnet, said outer cylindrical part of the proof mass being provided with a grooved portion, a force coil accommodated within the grooved portion of said outer cylindrical part concentrically with said annular permanent magnet, a movable pickoff coil supported by the proof mass element at the hub part thereof and concentrically within said force coil, a pair of fixed stator coils rigidly supported within the housing on opposite sides of said movable pickoff coil and along the sensitive axis thereof, and a shielding enclosure of magnetically susceptible material about said stator coils thereby to magnetically isolate said stator coils from said permanent magnet and force coil, said flexible support means for the proof mass including a pair of annular flat springs attached to opposite faces of the proof mass, said flat springs being supported by the hollow housing at the outer peripheral edges thereof, a transformer core mounted within the interior of the movable pickoff coil and the stator pickoff windings, coaxially therewith, said housing means formed therein longitudinally adjustably supporting the transformer core, said transformer core being operative to improve the coupling between the movable pickoff coil and the stator pickoff windings.

6. A linear accelerometer comprised of annularly shaped functioning parts that are coaxially assembled comprising: a cylindrically shaped hollow housing, an annular permanent magnet within the housing, the permanent magnet being so magnetized that the magnetic lines of force through the interior of said magnet are located in planes substantially perpendicular to the longitudinal axis of the permanent magnet, an annular proof mass structure concentric within the central opening of the annular permanent magnet, said proof mass being flexibly supported for displacement only along the concentric axis, said proof mass supporting an annular torque winding concentric with said concentric axis for interaction with said permanent magnet, and supporting an annular displacement transducer coil concentric with said torque winding and disposed inside thereof, a pair of annular stator pickoff coils spaced on opposite sides of said annular displacement transducer coil and affixed within said housing, said stator pickoff coils being coaxial with said annular displacement transducer coil, magnetic shielding means for preventing flux interaction between the torque coils and the permanent magnet and the annular displacement transducer coil and fixed pickoff coils, said flexible supporting means for said proof mass including a pair of annular flat springs sandwiching said proof mass and being supported by said hollow housing at the peripheral edges of the flat springs, a transformer core mounted within the displacement pickoff coils and the annular stator pickoff coils, coaxially therewith, means longitudinally adjustably supporting said transformer core, said transformer core being operative to improve the electrical coupling between the annular displacement transducer coil and the stator pickoff coils and a plurality of radially positioned stop members adjustably fitted to the housing adjacent one of the annular springs, said stop members being operative to limit the longitudinal movement of the proof mass along the concentric axis.

7. A linear accelerometer comprising a cylindrically shaped hollow housing, an annularly shaped permanent magnet mounted within the hollow housing, the permanent magnet being so magnetized that the magnetic lines of force through the interior of said magnet are located in planes substantially perpendicular to the longitudinal axis of the permanent magnet, an intertia proof mass member disposed within the central opening of the permanent magnet and being flexibly supported for displacement only along an axis concentric with the permanent magnet, said proof mass having a torque winding thereon disposed to produce magnetic flux in a direction along said concentric axis, a movable annular pickoff coil supported by said proof mass concentrically along said concentric axis, a pair of fixed stator windings fixedly supported along said concentric axis and spaced on opposite sides of said annular pickoff coil, and a shielding of magnetically susceptible material substantially completely enclosing said fixed stator windings to isolate said stator windings from said permanent magnet and torque coil, said flexible supporting means for said proof mass comprising a pair of annular disc springs disposed on opposite sides of said annular permanent magnet and sandwiching said proof mass member therebetween, said annular disc springs being fixedly supported near their outer peripheral edges thereof, thereby to enable flexure of said annular disc springs in unison along said concentric axis, a transformer core fitted to the interior of the movable pickoff coil and the fixed stator windings, coaxially therewith, said transformer core including a pair of longitudinally adjustable headed rods, threadably supported by the outer housing, said transformer core being operative to improve the electrical coupling between the movable annular pickoff coil and the fixed stator windings, a plurality of radially positioned stop members adjustably fitted to the cylindrical housing, adjacent one of the annular springs, said stop members being operative to limit the longitudinal movement of the proof mass along the concentric axis, a plurality of movable terminals supported by the proof mass, said movable terminals being connected to the movable pickoff coil and the movable torque coil respectively, a plurality of connecting terminals fixedly attached to the cylindrical housing, extending outward therefrom, and a flexible lead connecting each of the movable terminals to the corresponding connecting terminal.

8. A miniature linear accelerometer comprised of a cylindrically shaped hollow housing, a small annularly shaped permanent magnet supported within said hollow housing, the permanent magnet being so magnetized that the magnetic lines of force through the interior of the permanent magnet are located in planes substantially perpendicular to the longitudinal axis of the permanent magnet, said proof mass being flexibly supported for displacement along the sensitive axis, said proof mass element having an inner hub part and an outer cylindrically shaped part, with the outer cylindrically shaped part being closely spaced concentrically from the inner transverse wall of the permanent magnet, said outer cylindrical part of the proof mass being provided with a grooved portion, a torque coil accommodated within the grooved portion of said outer cylindrical part concentrically with said annular permanent magnet, a movable pickoff coil supported by the proof mass element at the hub part thereof and concentrically within said torque coil, a pair of fixed stator coils rigidly supported within the housing on opposite sides of said movable pickoff coil and along the sensitive axis thereof, a shielding enclosure of magnetically susceptible material about said stator coils, thereby to magnetically isolate said stator coils from said permanent magnet and torque coil, said flexible support means for the proof mass including a pair of annular flat springs attached to opposite faces of the proof mass, said springs being supported by the outer housing at the outer peripheral edges of the flat springs, a transformer core mounted within the interior of the movable pickoff coil and the stator pickoff coils, coaxially therewith, said housing having means formed therein threadably supporting the transformer core, said transformer core being operative to improve the coupling between the movable pickoff coil and the stator pickoff coils, a plurality of movable terminals supported by the proof mass element, said movable terminals being connected to the movable pickoff coil and the movable torque coil, respectively, a plurality of connecting terminals fixedly attached to the cylindrical housing, extending outward therefrom, and a flexible lead connecting each of the movable terminals to the corresponding connecting terminals.

References Cited in the file of this patent

UNITED STATES PATENTS

| | | |
|---|---|---|
| 2,591,921 | Cosgriff | Apr. 8, 1952 |
| 2,697,594 | Stanton | Dec. 21, 1954 |
| 2,767,973 | terVeen | Oct. 23, 1956 |
| 2,888,256 | Sedgfield | May 26, 1959 |
| 2,985,021 | Lewis | May 23, 1961 |